(12) United States Patent
Ghanea-Hercock

(10) Patent No.: US 9,905,389 B2
(45) Date of Patent: Feb. 27, 2018

(54) METHOD OF MANUFACTURING AN ARTICLE WITH INTEGRAL ACTIVE ELECTRONIC COMPONENT

(71) Applicant: BRITISH TELECOMMUNICATIONS public limited company, London (GB)

(72) Inventor: Robert Ghanea-Hercock, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/675,835

(22) Filed: Aug. 14, 2017

(65) Prior Publication Data

US 2017/0345610 A1    Nov. 30, 2017

Related U.S. Application Data

(62) Division of application No. 14/658,797, filed on Mar. 16, 2015.

(30) Foreign Application Priority Data

Mar. 21, 2014   (EP) .................................. 14250050

(51) Int. Cl.
*H01J 19/04*  (2006.01)
*H01J 21/10*  (2006.01)
(Continued)

(52) U.S. Cl.
CPC .............. *H01J 19/04* (2013.01); *B05D 1/265* (2013.01); *B05D 1/36* (2013.01); *B29C 64/188* (2017.08);
(Continued)

(58) Field of Classification Search
CPC ... H01J 19/04; H01J 19/38; H01J 9/18; B05D 1/36; B05D 1/265
See application file for complete search history.

(56) References Cited

U.S. PATENT DOCUMENTS

| 4,575,330 A | 3/1986 | Hull |
| 2006/0006787 A1 | 1/2006 | Champion et al. |
| 2015/0270089 A1 | 9/2015 | Ghanea-Hercock |

FOREIGN PATENT DOCUMENTS

| JP | 9-35670 | 2/1997 |
| JP | 2006-49305 | 2/2006 |

(Continued)

OTHER PUBLICATIONS

EP Search Report for EP Application No. 14250050, dated Sep. 24, 2014, 4 pages.

(Continued)

*Primary Examiner* — Joseph L Williams
(74) *Attorney, Agent, or Firm* — Nixon & Vanderhye PC

(57) ABSTRACT

A method of manufacturing an article with integral active electronic component includes using an additive manufacturing process to: a) form a non-electrically conductive substrate; b) form a non-electrically conductive perforated layer having an aperture; c) form electrically conductive anode and cathode elements spaced in the aperture; d) deposit a conductive electrical connection to each of the elements suitable for imparting an electrical potential difference between the elements; and e) form a non-electrically conductive sealing layer atop the perforated layer so as to retain and seal the aperture in the perforated layer.

16 Claims, 7 Drawing Sheets

(51) Int. Cl.
*H01J 21/04* (2006.01)
*B29C 64/188* (2017.01)
*H01J 19/08* (2006.01)
*B05D 1/26* (2006.01)
*B05D 1/36* (2006.01)
*B33Y 80/00* (2015.01)
*B33Y 10/00* (2015.01)
*B33Y 30/00* (2015.01)

(52) U.S. Cl.
CPC .............. *H01J 19/08* (2013.01); *H01J 21/04* (2013.01); *H01J 21/10* (2013.01); *B33Y 10/00* (2014.12); *B33Y 30/00* (2014.12); *B33Y 80/00* (2014.12)

(56) References Cited

FOREIGN PATENT DOCUMENTS

| JP | 2008-311083 | 12/2008 |
|---|---|---|
| KR | 10-2001-0068429 | 7/2001 |
| KR | 10-2013-0051767 | 5/2013 |

OTHER PUBLICATIONS

Cartwright, J. et al., Return of the Vacuum Tube; May 23, 2012, http://news.sciencemag.org/physics//2012/05/return-vacuum-tube?ref=hp, 6 pages.

Turpin, P. 'Sci', "An old-school solution to printing reprap electronics?", Feb. 2, 2010, http://forums,reprap.org/read.php?13,34801, 3 pages.

Bayless, J. et al., "Wire Embedding 3D Printer", Apr. 12, 2010, 45 pages.

Jiguet, S. et al., "Conductive SU8-Silver Composite Photopolymer", Swiss Federal Institute of Technology, pp. 125-128, © 2004 IEEE, 4 pages.

Ladd, C. et al., 3D Printing of Free Standing Liquid Metal Microstructures, Advanced Materials, 2013, 5 pages.

Bayless, J. et al., http://youtu.be/iclmH6-ba5Y, "RepRap 3D Printer with Wire Embedding Capability", Uploaded Apr. 14, 2010 by APSC 459 Project #1013.

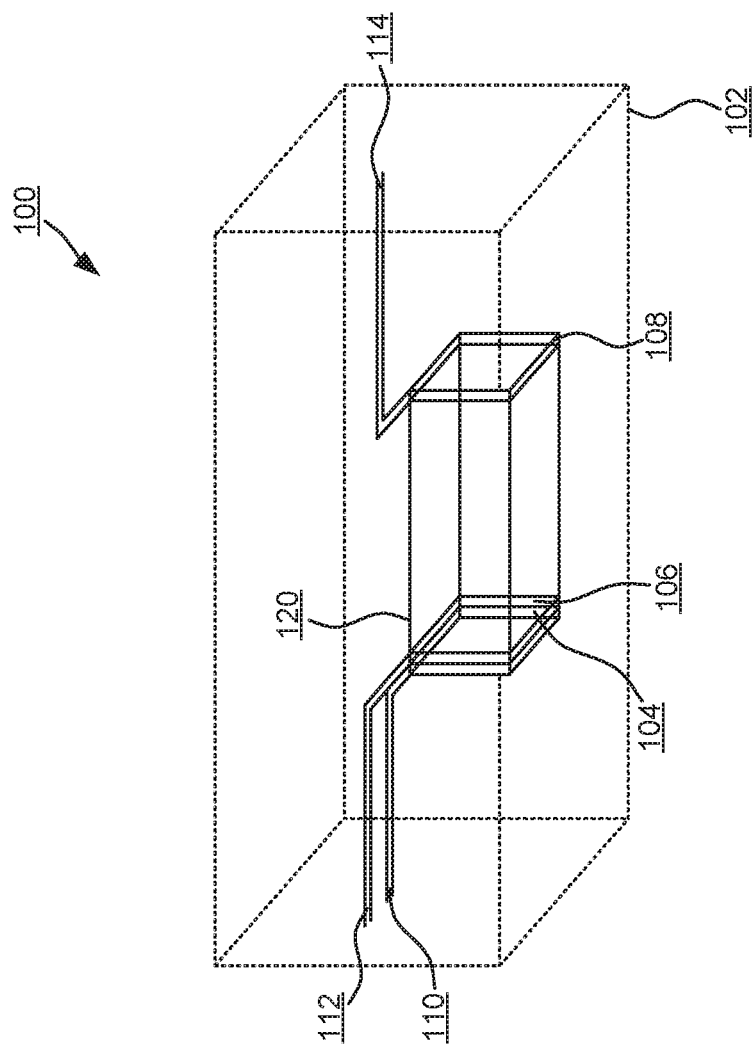

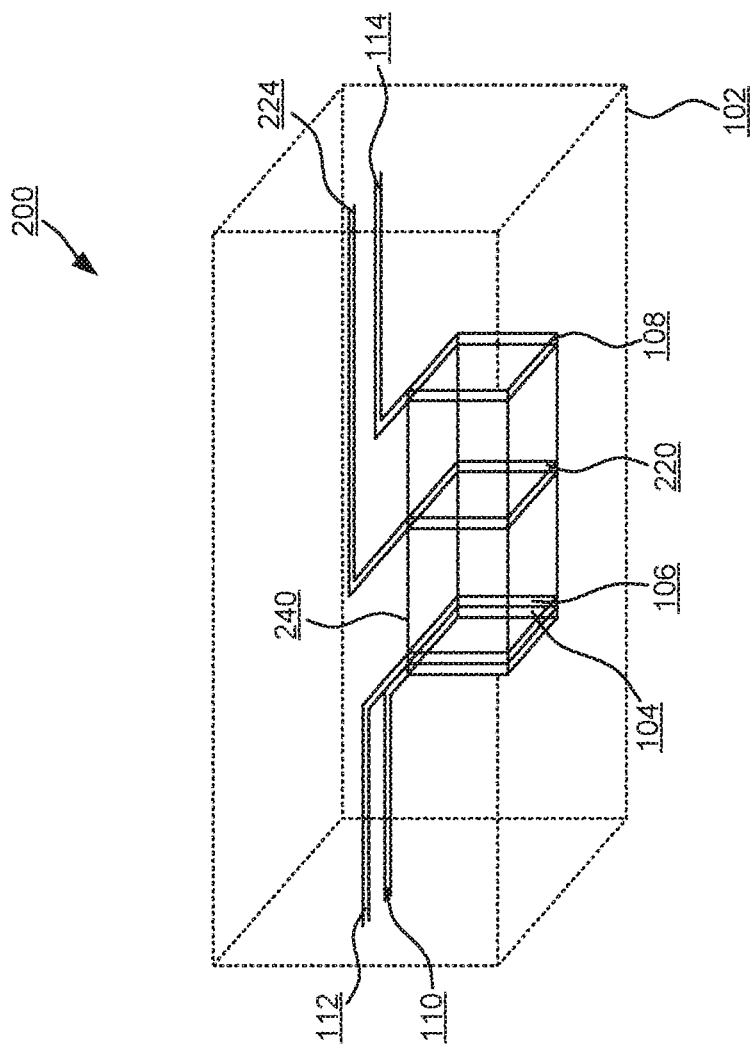

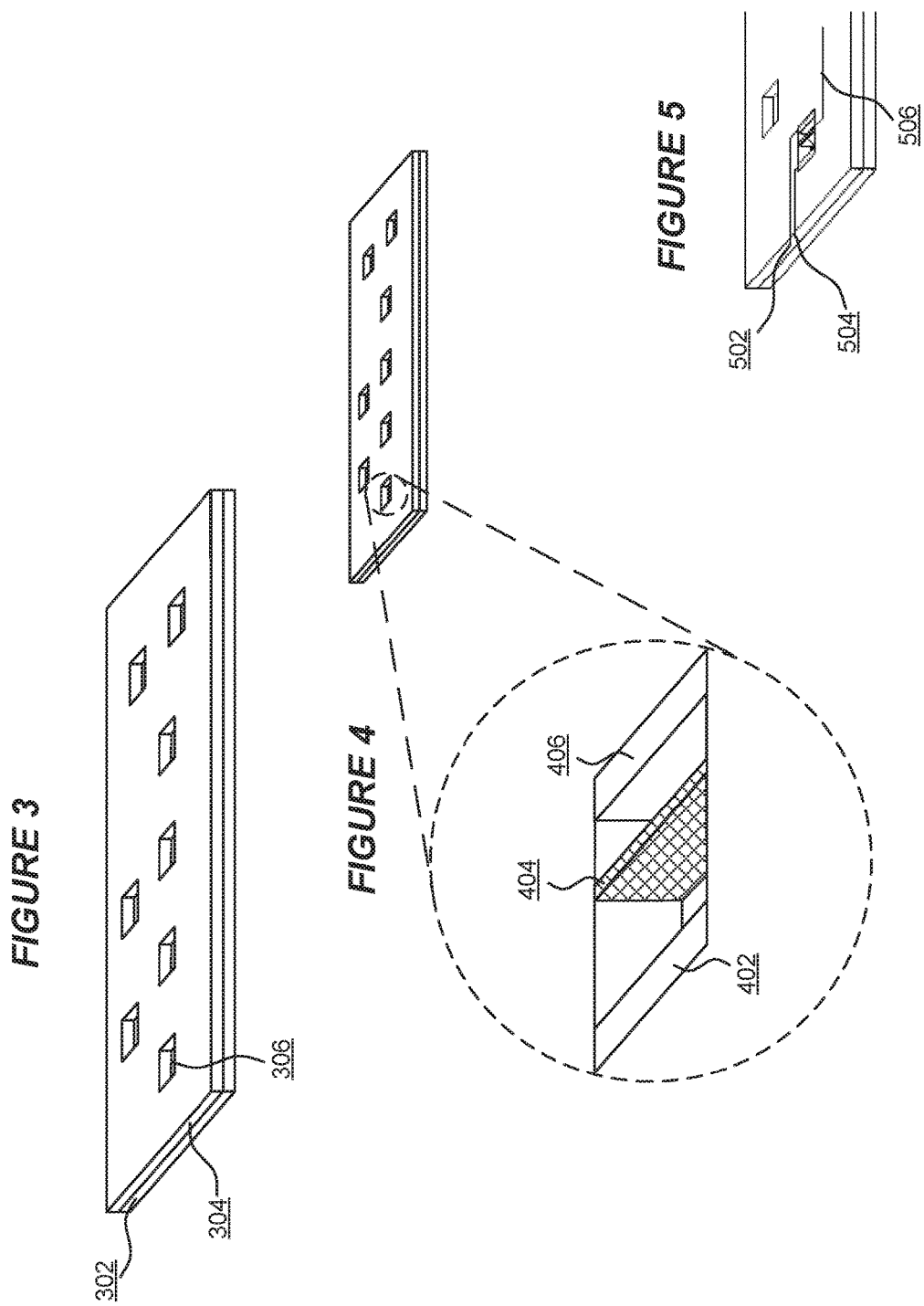

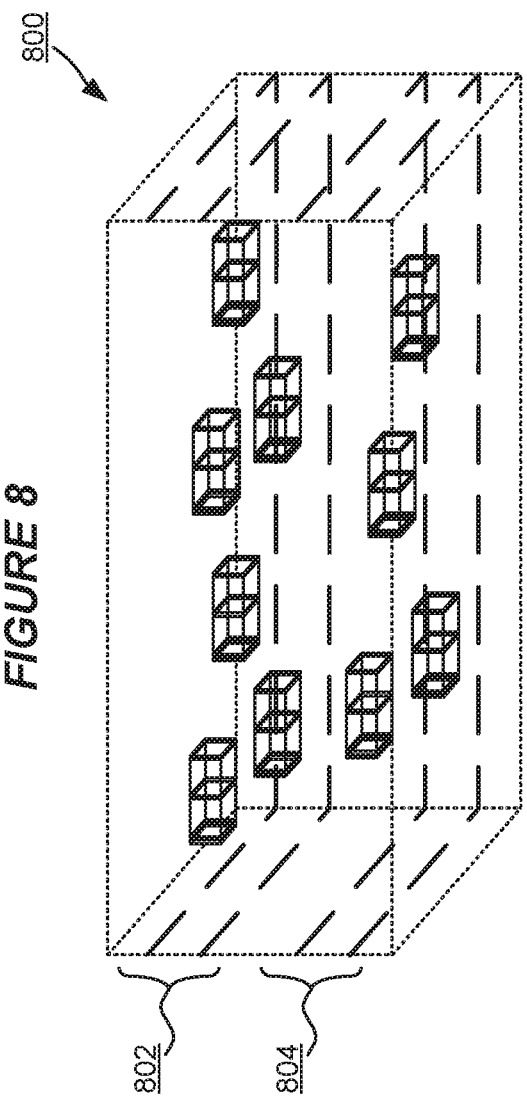
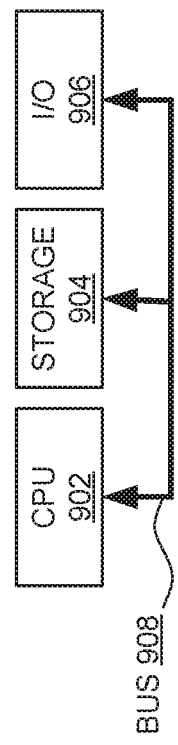

METHOD OF MANUFACTURING AN ARTICLE WITH INTEGRAL ACTIVE ELECTRONIC COMPONENT

CROSS-REFERENCE TO RELATED APPLICATION

This is a divisional of U.S. application Ser. No. 14/658,797, filed Mar. 16, 2015, which claims priority to EP Application No. 14 250 050.3, filed 21 Mar. 2014, the entire contents of each of which are hereby incorporated by reference.

FIELD OF THE INVENTION

The present invention relates to the manufacture of active electronic components. In particular it relates to the manufacture of a 3D printed article including a 3D printed thermionic electronic component integral with a fabric of the article.

BACKGROUND OF THE INVENTION

Additive manufacturing, also known as three dimensional (3D) printing, is a process of manufacturing a three dimensional solid object from a model such as a digital model by an additive process in which material is layered, adhered, bonded or otherwise deposited successively until the solid object is formed. Such an approach is in contrast to traditional manufacturing techniques where articles are formed from the assembly of parts which themselves may be machined, cast or moulded.

There are many benefits to additive manufacturing over traditional manufacturing techniques, including technical benefits and commercial benefits. Technically, additive manufacturing allows virtually any arrangement of a three dimensional object to be created from a growing number of materials, including plastics, metals and ceramics. The arrangement can include complex features, even internally, since the additive approach to manufacturing is capable of generating complex structure. Additive approaches generate less waste compared to traditional approaches, provide increased consistency between articles of manufacture, improved speed of manufacture from initial design with minimal setup required, the advantages of novel structures and shapes and new combinations of materials.

Commercially, additive manufacturing provides considerable cost-savings over traditional manufacturing techniques, especially where a number of articles for manufacture is relatively small. For example, prototypes, proof-of-concepts, spare-parts and articles manufactured in isolated or remote locations, such as in orbit or space, are readily produced at low cost using additive manufacturing. The speed of manufacturing is also a benefit since a three dimensional article can be produced from a three dimensional design relatively rapidly.

Additive manufacturing covers a number of approaches. Extrusion deposition is an approach to additive manufacturing in which beads of material are extruded in a controlled manner either by way of a moveable extruder ("print-head"); a moveable table or support; or both. The extruded beads harden rapidly to form a layer or part of an article onto which further extrusion can take place. In this way the article is built-up additively.

An alternative approach is the selective fusing of granular materials such as a selective sintering or melting of metals or polymers. Using such an approach granular material is deposited in layers and selectively sintered, melted or bonded using, for example, convection heat, laser or electron beam. The selection is made based on a three dimensional model of the article in a layered manner. In this way the article is built-up additively.

Use of additive manufacturing to produce electrical or electronic devices has been severely constrained since additive manufacturing is not suitable for manufacturing complex modern electronic components from many disparate materials. While additive manufacturing has found applications in the printing of planar circuit board layouts with component sockets and interconnects in combination with trenches or routes for electrical connections, there is currently a requirement for placement, installation and/or assembly of electrical and electronic components following the additive manufacturing process. This requirement for post-manufacture assembly and/or installation has the considerable disadvantage that component locations, sockets and routes must be accessible in an additively-manufactured product. Accordingly, the hugely beneficial characteristics of additive-manufacturing of accurately producing complex, internalised and potentially inaccessible structures are entirely lost in the electronic field. Furthermore, the requirement for post-manufacture assembly and/or installation imposes burdens of additional manufacturing steps that considerably erode the benefits of additive manufacturing.

Thus it would be beneficial to produce electronic devices using additive manufacturing approaches without the aforementioned disadvantages.

SUMMARY OF THE INVENTION

The present invention accordingly provides, in a first aspect, a method of manufacturing an article with integral active electronic component comprising: using an additive manufacturing process to: a) form a non-electrically conductive substrate; b) form a non-electrically conductive perforated layer having an aperture; c) form electrically conductive anode and cathode elements spaced in the aperture; d) deposit a conductive electrical connection to each of the elements suitable for imparting an electrical potential difference between the elements; e) form a non-electrically conductive sealing layer atop the perforated layer so as to retain and seal the aperture in the perforated layer.

Thus, embodiments of the present invention provide for the production of a three dimensional article by way of the additive manufacturing process. The use of such a manufacturing process allows for the production of a three dimensional article having potentially complex internal characteristics with the integration of active electronic components such as diodes and triodes within the fabric of the article. Due to the production and integration of active electronic components as part of the article manufacturing process, there is no requirement for post-production assembly or installation of electronic components. Thus, manufacture of articles with installed electronic components can occur contemporaneous with the manufacture of the substantive three dimensional structure of the article. This relieves the manufacturing process from considerations of post-production assembly and installation of electronic components, such as burden approaches of the prior art that require multi-part manufacture with accessible integration interfaces and the like. Further, the cost of manufacture is dramatically reduced due to the use of additive manufacturing process, especially where small numbers of articles are required such as in prototyping or proof-of-concept manufacture, or in remote or inaccessible locations such as in orbit or space.

The inclusion of active electronics within the fabric of a three dimensional article will reduce the overall weight of the article due to the absence of additional components, appendages. Furthermore, articles can be made more streamlined, with electronic componentry embedded within the article, such as internally in an imperceivable, undetectable and/or unobtrusive location within the article. Where the active electronic component is embedded in the article, the component can be protected from exposure to fluids such as moisture or air. The ability of additive manufacturing to produce articles on the micro-scale provides for potentially 'intelligent' (in the sense of including electronic componentry) articles in all manner of applications, including: electronics embedded within cellular telephone cases or covers; electronics embedded within cable sheaths; electronics embedded within fabric or clothing; electronics embedded within cases, covers, walls or other structural elements of other devices such as consumer or entertainment devices; electronics in spare-parts; and the like.

The removal of the requirement for accessibility of an electrical circuit and component locations for post-manufacturing assembly or installation dramatically redefines how electrical circuits and electronic devices can be designed and implemented in articles of manufacture. Embodiments of the present invention provide for true three-dimensional arrangements of active electronic components and the connections therebetween without a requirement for accessibility of individual components or connections. This provides for an increase in the efficient use of space or volume of an article, and potentially for the reuse of active electronic components where appropriate by circuits of the same device under control. Vertical interconnects can provide for three dimensional processing elements such as cubic or other three dimensional arrangements of electronic components and circuits. A layered architecture of electronic components can be produced with layers of active electronic components within a single three dimensional article. Common services such as provision of power, dissipation of power, dissipation of thermal energy and the like can be provided by strata of service layers included as part of the additive manufacturing process, such as metal layers for power supply or layers of thermally efficient conducting materials for heat dissipation or transfer. Conceivably, channels and conduits can be provided, manufactured as part of the additive manufacturing process, for the communication of fluids such as coolants or gases to further provide services to electronic components such as the transfer of heat from within the article, such as heat generated by the active electronic components.

A particular advantage of the use of thermionic electronic components is the benefits of such components over silicon equivalents such as silicon transistors. Thermionic components have considerable robustness and provide improved analogue signal transfer properties. For example, thermionic components are highly resistant to electromagnetic pulses and solar flare activity providing particular benefits on application to satellites technology or critical infrastructure systems.

While the use of thermionic electronic components has been largely superseded by semiconductor equivalents, the inventors have realised the surprising benefits of such components in the field of additive manufacturing based on the simplicity of manufacturing such components, capabilities for which now exist in the field of additive manufacturing, the effectiveness of such components and their reliability.

Preferably, forming one or more of: the substrate; perforated layer; and sealing layer includes forming a channel providing fluid communication between the aperture and an evacuation port of the article, wherein the evacuation port is suitable for evacuating the aperture of gas so as to generate vacuum-like conditions in the aperture.

Preferably the additive manufacturing process takes place within a sealed atmosphere constituted substantially of an inert gas so as to encase the inert gas in the aperture on formation of the sealing layer.

Preferably the anode and cathode are positioned at opposing sides of the aperture.

Preferably the cathode is located centrally in the aperture and the anode occupies at least part of a wall of the aperture.

Preferably the additive manufacturing process includes an extrusion deposition process.

Preferably the additive manufacturing process includes a granular material binding process.

Preferably the method further comprises: using the additive manufacturing process to form a filament element in thermal proximity with the cathode so as to, in use, induce thermionic emission by the cathode.

Preferably the method further comprises using the additive manufacturing process to: form a conductive grid element spaced from, and positioned between, the anode and cathode elements; and deposit a conductive electrical connection to the grid for providing an electrical signal to the grid, such that the grid regulates the transmission of electrons from the cathode to the anode.

Preferably at least one of the: non-electrically conductive substrate; perforated layer; and sealing layer are formed in ceramic.

Preferably at least one of the: anode; the grid; and the conducive electrical connections are formed from a gallium alloy.

Preferably the gallium alloy is a binary eutectic alloy of gallium and indium.

Preferably the cathode includes tungsten.

The present invention accordingly provides, in a second aspect, an article with integral active electronic component manufactured by the process of any preceding claim.

The present invention accordingly provides, in a third aspect, a 3D printed apparatus comprising a 3D printed thermionic electronic component integral with a fabric of the apparatus.

Preferably the thermionic electronic component is a diode comprising a cathode and an anode.

Preferably the thermionic electronic component is a triode comprising a cathode, an anode and a grid to regulate the passage of electrons from the cathode to the anode.

Preferably the apparatus further comprises a 3D printed circuit.

The present invention accordingly provides, in a fourth aspect, an additive manufacturing apparatus for manufacturing an article with integral active electronic component, the apparatus comprising: a computer system; a first additive manufacturing component adapted to form non-electrically conductive three dimensional structures; a second additive manufacturing component adapted to form electrically conductive three dimensional structures; wherein the first and second additive manufacturing components are operable under control of the computer system, the computer system being adapted to control the components to: a) form a non-electrically conductive substrate; b) form a non-electrically conductive perforated layer having an aperture; c) form electrically conductive anode and cathode elements spaced in the aperture; d) deposit a conductive electrical connection to each of the elements suitable for imparting an electrical potential difference between the elements; e) form a non-electrically conductive sealing layer atop the perforated layer so as to retain and seal the aperture in the perforated layer.

The present invention accordingly provides, in a fifth aspect, a computer system for controlling an additive manufacturing apparatus, the additive manufacturing apparatus being adapted to manufacture three dimensional structures from both non-electrically conductive and electrically conductive materials simultaneously, the computer system being operable to control the additive manufacturing apparatus to perform the method described above.

BRIEF DESCRIPTION OF THE DRAWINGS

Embodiments of the present invention will now be described, by way of example only, with reference to the accompanying drawings, in which:

FIG. 1 depicts an exemplary three dimensional article with integral diode electronic component produced in accordance with embodiments of the present invention;

FIG. 2 depicts an exemplary three dimensional article with integral triode electronic component produced in accordance with embodiments of the present invention;

FIG. 3 depicts an arrangement of a non-electrically conductive substrate having a non-electrically conductive perforated layer atop in accordance with embodiments of the present invention;

FIG. 4 depicts the arrangement of FIG. 3 having electrically conductive anode, cathode and grid elements formed in an aperture in accordance with embodiments of the present invention;

FIG. 5 depicts the arrangement of FIG. 4 having conductive electrical connections to each of the elements formed in the aperture in accordance with embodiments of the present invention;

FIG. 8 depicts an exemplary three dimensional article with integrated active electronic components disposed in a layers in accordance with embodiments of the present invention;

FIG. 9 is a block diagram of a computer system suitable for controlling the operation of an additive manufacturing machine in accordance with embodiments of the present invention;

DETAILED DESCRIPTION OF EMBODIMENTS

Figure 6:
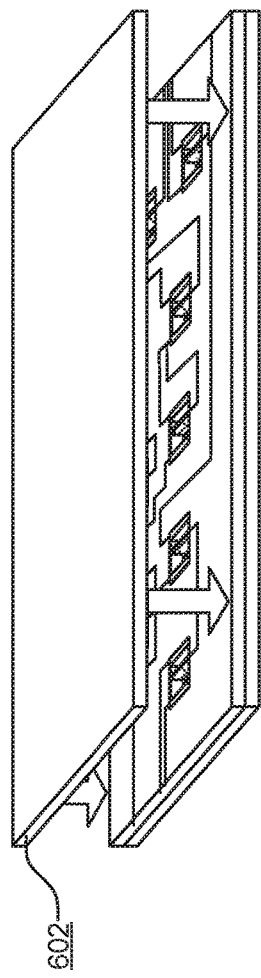
FIG. 6 depicts the arrangement of FIG. 5 having a non-electrically conductive sealing layer formed atop the perforated layer in accordance with embodiments of the present invention.

FIG. 1 depicts an exemplary three dimensional article 100 with integral diode 120 electronic component produced in accordance with embodiments of the present invention. The article 100 is constructed using an additive manufacturing approach including one or more techniques such as, inter alia: an extrusion deposition process; a material binding process such as selective laser sintering, direct metal laser sintering, selective laser melting or electron beam melting; and/or a stereolithographic approach such as photopolymerisation. Such techniques are also known as 3D printing, and a product or resulting article of such techniques is known as a 3D printed article or apparatus. The article 100 is comprised of a substantive structure 102 such as a body, framework, lattice, arrangement or other structure substantially constituting the article, otherwise referred to as the fabric of the article. For example, the article 100 can be, inter alia: a part; prototype; component; appliance; tool; cover; case; model; or any other conceivable three dimensional article. The substantive structure 102 is formed from a non-electrically conductive material by the additive manufacturing process. For example, the substantive structure 102 is a plastic such as a polymer, and preferably a plastic able to tolerate high temperatures. Alternatively, the substantive structure 102 can be formed of a ceramic or similar material. Other non-electrically conductive materials suitable for forming the substantive structure 102 will be apparent to those skilled in the art.

The article 100 has formed within, and integral to, the substantive structure 102, an active electronic component as a diode 120. The diode 120 is integral to the fabric of the article 100 and is at least partly constituted by the substantive structure 102 of the article 100. It will be appreciated by those skilled in the art that an active electronic component, such as a diode, rectifier, triode and the like, is an electronic component that requires a power source for one or more of its functions, as distinct from a passive electronic component such as a resistor or capacitor, which requires no power source for operation. The diode 120 is formed in an aperture in the substantive structure 102 of the article 100. At one end of the aperture a cathode 106 is formed as an electrically conductive element. At the other end of the aperture, and spaced from the cathode 106, an anode 108 is formed as a second electrically conductive element. The cathode 106 and anode 108 are formed by an additive manufacturing process. In one embodiment the anode is formed by the 3D printing technique for liquid metal structures described by Ladd et al in "3D Printing of Free Standing Liquid Metal Microstructures" (Collin Ladd et al, Advanced Materials, Volume 25, Issue 36, pages 5081-5085, Sep. 25, 2013). Ladd et al describe an approach to extruding conductive metal wires at room temperature. Such an approach is particularly suited to combination with extruding of other materials such as polymer extrusion. For example, the anode 108 can be constituted of a gallium alloy such as a binary eutectic alloy of gallium and indium which can be extruded in an additive manufacturing process at room temperature as described by Ladd et al. Additionally or alternatively, the cathode 106 and/or anode 108 are formed by a material binding process such as sintering. For example, direct metal laser sintering in which a laser is used to precisely and selectively sinter metal powder, can be employed for anode 108 and/or cathode 106 formation.

The cathode 106 is a hot cathode that heats to cause thermionic emission of electrons from the cathode 106. In one embodiment the cathode 106 also acts as a filament to achieve the required heating. Alternatively, a separate filament 104 is provided in thermal proximity with the cathode 106 so as to heat the cathode 106 to induce thermionic emission by the cathode 106. Preferably, cathode 106 is formed from an electrical conductor with a high heat resistance, such as tungsten or a tungsten alloy. Such materials are known to be formable by an additive manufacturing process such as a bonded tungsten 3D printing process as is available from ExOne Company (eg. ExOne's M-Flex 3D printer).

Each of the anode 108 and cathode 106 are electrically connected to a conductive electrical connection 114, 112. The electrical connections 114, 112 are suitable for imparting an electrical potential difference between the anode 108 and cathode 106. For example, the anode 108 electrical connection 114 is connected to a source of positive electrical potential such as a positive voltage, while the cathode 106 electrical connection 112 is connected to a source of relatively less electrical potential such as ground. Where provided, the filament 104 also has an electrical connection 110 for powering the filament to generate heat. The electrical connections 110, 112, 114 are formed as part of an additive manufacturing process such as the approach of Ladd et al described above, or any suitable approach to depositing conductive electrical connections by additive manufacturing while manufacturing the article 100.

Most preferably, the aperture formed for the diode 120 is a sealed vacuum, such as can be achieved by a manner described later. Alternatively, the aperture is sealed store of an inert gas such as a noble gas or nitrogen, the reactivity and effect of which on thermionic emission and transfer of electrons by and from the cathode is predictable and known. To ensure the provision of an inert gas in the aperture of the article 100, the additive manufacturing process for the article 100 can be performed in a sealed atmosphere constituted substantially, preferably entirely, of the inert gas so as to encase the inert gas in the aperture on sealing of the aperture.

Thus the article 100 includes an active electronic component as a diode 120. When a potential difference is imparted between the hot cathode 106 and the anode 108, electrons will travel from the cathode 106 to the anode 108 in the manner known from vacuum tube diodes.

FIG. 2 depicts an exemplary three dimensional article 200 with integral triode 240 electronic component produced in accordance with embodiments of the present invention. Many of the features of FIG. 2 are identical to those described above with respect to FIG. 1 and these will not be repeated here. FIG. 2 further includes a grid 220 element as an electrically conductive element spaced from, and positioned between, the cathode 106 and the anode 108, with an associated deposited electrical connection 224 for providing an electrical signal to the grid 220. The grid 220 is traversable by electrons arising from thermionic emission of the cathode 106 and the grid 220 regulates the transmission of electrons from the cathode 206 to the anode 108 depending on the electrical potential of the grid 220 determined by the electrical signal. Such a grid 220 is formed as part of the additive manufacturing process for the article 200, such as by the approach of Ladd et al described above which is particularly suited to creating a grid, lattice or array arrangement of electrically conductive elements.

Thus the article 200 includes an active electronic component as a triode 240. When a potential difference is imparted between the hot cathode 106 and the anode 108, electrons will travel from the cathode 106 to the anode 108 regulated by an electrical potential at the grid 220 determined by an electrical signal for the grid 220, in the manner known from vacuum tube triodes or valves.

Thus embodiments of the present invention arranged according to FIG. 1 or FIG. 2 provide a 3D printed article or apparatus 100, 200 comprising a 3D printed thermionic electronic component 120, 240 integral with a fabric 102 of the apparatus 100, 200. The thermionic electronic component 120, 240 is a diode comprising a cathode 106 and an anode 108, or a triode comprising a cathode 106, an anode 108 and a grid 220 to regulate the passage of electrons from the cathode to the anode. The apparatus 100, 200 can further include a 3D printed circuit by way of electrically conductive connections 110, 112, 114, 224 connecting external to the apparatus or, conceivably, to other active electronic components elsewhere in the apparatus 100, 200.

An exemplary method of additive manufacture of an article such as article 100 or article 200 will now be described. FIG. 3 depicts an arrangement of a non-electrically conductive substrate 302 having a non-electrically conductive perforated layer 304 atop in accordance with embodiments of the present invention. The substrate 302 is initially formed from a non-electrically conductive material such as a plastic, polymer or ceramic using an additive manufacturing process such as hereinbefore described. Subsequently, the perforated layer 304 is formed atop the substrate using a similar manufacturing process to that of the substrate except that one or more apertures 306 are formed in the perforated layer 304. The apertures 306 are illustrated as rectangular in shape though it will be appreciated that any shape can be used. In one embodiment, the formation of the apertures 306 is achieved by defining a digital model of the perforated layer 304, including definitions of the apertures 306, and interpretation of the digital model by a control apparatus or process of an additive manufacturing process so as to control the additive manufacturing process to create the apertures 306 such as by way of omitting to extrude or bond non-conductive material in the locations of the apertures 306.

FIG. 4 depicts the arrangement of FIG. 3 having electrically conductive cathode 402, anode 406 and grid 404 elements formed in an aperture in accordance with embodiments of the present invention. An additive manufacturing process is used to form the cathode 402, anode 406 and (optionally) grid 404 as electrically conductive elements described above. For example, the approach of Ladd et al is used to provide the anode 406 and grid 404. The cathode 402 can be provided by bonded tungsten 3D printing using a sintering technique such as direct metal laser sintering. While FIG. 4 is illustrated with a grid 404 element, it will be appreciated that the production of a diode active electronic component would not require the grid 404 element. Further, it will be appreciated that a separate filament could additionally be provided in the aperture in thermal proximity with the cathode 402. FIG. 5 depicts the arrangement of FIG. 4 having conductive electrical connections 502, 504, 506 to each of the elements 402, 404, 406 formed in the aperture 306 in accordance with embodiments of the present invention. The conductive electrical connections 502, 504, 506 are preferably provided by the approach of Ladd et al described above.

FIG. 6 depicts the arrangement of FIG. 5 having a non-electrically conductive sealing layer 602 formed atop the perforated layer 304 in accordance with embodiments of the present invention. The non-electrically conductive sealing layer 602 is formed in a similar manner, and using similar or identical materials, to the substrate 302 and perforated layer 304. The sealing layer 602 serves to retain and seal the apertures 306 in the perforated layer 304. In one embodiment, at least the sealing layer 602 is formed while the article of manufacture is enclosed within in a sealed atmosphere constituted of a noble gas and the sealing of the apertures 306 is hermetic so that there is no fluid communication into or out of the apertures 306.

Figure 7:
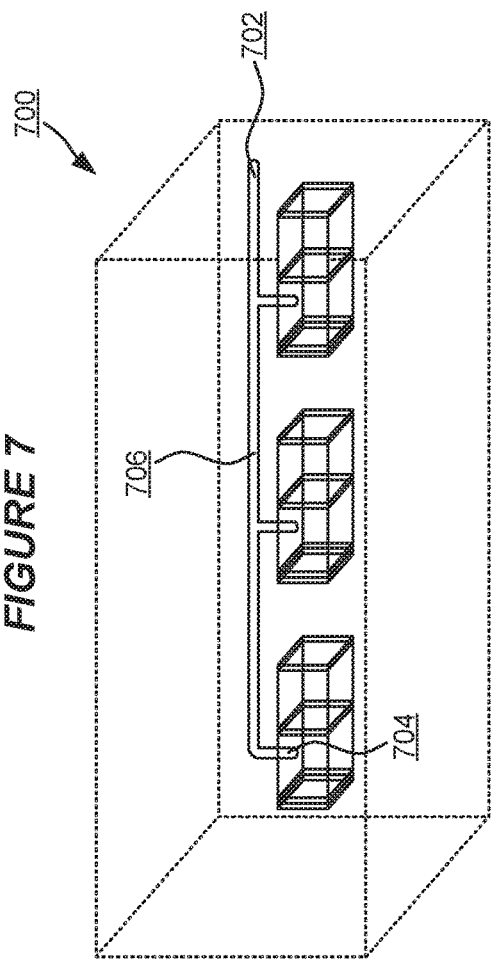
FIG. 7 depicts an exemplary three dimensional article with integral active electronic components and having a channel to an evacuation port of the article in accordance with embodiments of the present invention.

In an alternative embodiment, the sealing layer 602 does not hermetically seal the apertures, as will be described with respect to FIG. 7. FIG. 7 depicts an exemplary three dimensional article 700 with integral active electronic components and having a channel 706 to an evacuation port 702 of the article in accordance with embodiments of the present invention. The article 700 is manufactured by an additive manufacturing process as hereinbefore described such that the integral active electronic components are integral with a fabric of the apparatus 700. Additionally, the additive manufacturing process is adapted to form the channel 706 for fluid communication between an aperture of (potentially multiple) active electronic components and the evacuation port 702. The channel 706 can be formed in any, or multiple, of the substrate 302, the perforated layer 304 or the sealing layer 602, and a direction, path or route of the channel 706 is not limited except that the channel 706 cannot interrupt any conductive electrical connection in the article 700. The channel 706 interfaces with each electronic component via an opening 704 into the aperture of the electronic component. The evacuation port 702 is provided at one end of the channel 706, or at a point along the channel 706, in order to effect the evacuation of gas from the channel 706 and the apertures of active electronic components in the article 700. The evacuation can be achieved by use of a vacuum pump or the like, and is followed by sealing the evacuation port 702 in order to maintain vacuum-like conditions in the apertures of the active electronic devices. Preferably, the apertures contain a vacuum in order to improve the transmission of electrons arising from the thermionic emission at the cathode 402.

FIG. 8 depicts an exemplary three dimensional article 800 with integrated active electronic components disposed in a layers 802, 804 in accordance with embodiments of the present invention. Due to the additive manufacturing process employed to manufacture articles in accordance with embodiments of the present invention, the scope for novel, efficient and effective arrangements of active electronic components is increased. FIG. 8 illustrates how such components can be arranged in layers 802, 804 so as to stratify the article 800, with potentially electrical connection between electronic components occurring intra-layer and inter-layer, and potentially spanning many layers. Such connections can be modelled by a 3D model of the article 800 and can be generated as part of the additive manufacturing process irrespective of the direction in which such connections occur. Similarly, the orientation, shape and dimensions of the active electronic components themselves can be adapted, varied, configured and/or tailored depending on the requirements of the article 800.

It will be appreciated that passive electronic components can also be formed as part of an additive manufacturing process, such as resistors and capacitors. Such passive components are relatively straightforward to manufacture. For example, a resistor can be formed as a solid printed blocks of ceramic material. A means of insulation of the passive component from the substantive body of the article may be required and can be achieved by enclosing such components in apertures within an article, suspended or held in place by electrical connections. Similarly, capacitors can be created using a structure similar to the active electronic devices except with 2 parallel metallic plates deposited within the aperture. Thus active and passive components required for substantially all electronic and logic requirements of an electronic apparatus can be formed integrally within a three dimensional article using the additive manufacturing approach.

FIG. 9 is a block diagram of a computer system suitable for controlling the operation of an additive manufacturing machine in accordance with embodiments of the present invention. A central processor unit (CPU) 902 is communicatively connected to a storage 904 and an input/output (I/O) interface 906 via a data bus 908. The storage 904 can be any read/write storage device such as a random access memory (RAM) or a non-volatile storage device. An example of a non-volatile storage device includes a disk or tape storage device. The I/O interface 906 is an interface to devices for the input or output of data, or for both input and output of data. Examples of I/O devices connectable to I/O interface 906 include a keyboard, a mouse, a display (such as a monitor) and a network connection.

Figure 10:
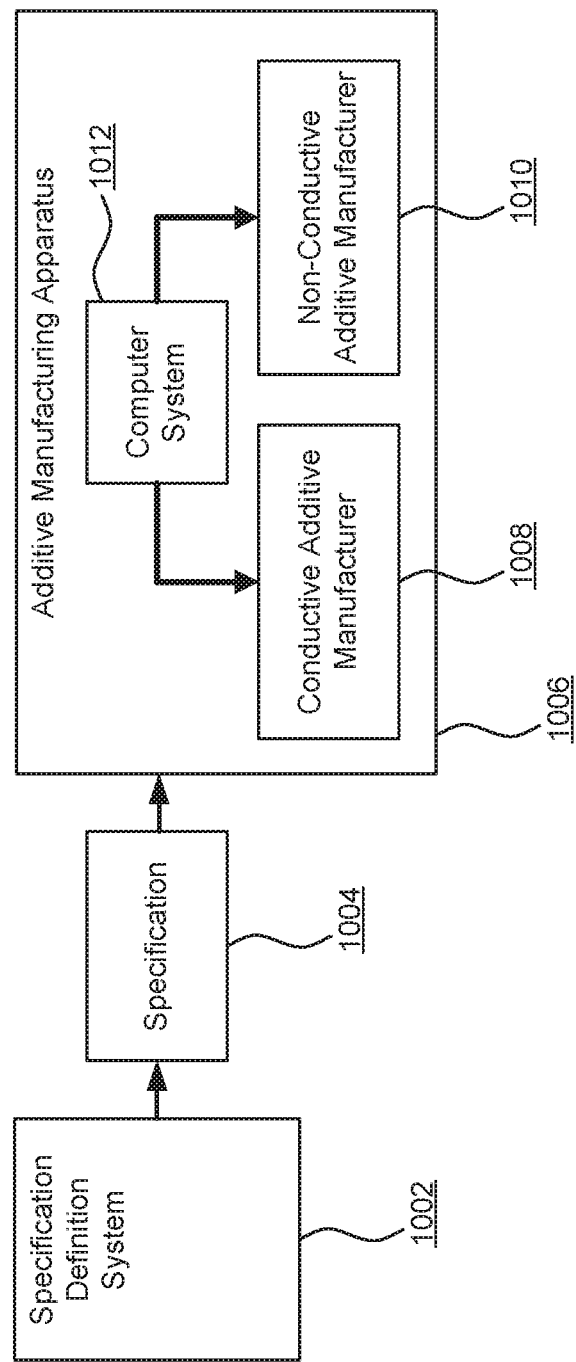
FIG. 10 is a component diagram of an additive manufacturing apparatus in accordance with embodiments of the present invention.

FIG. 10 is a component diagram of an additive manufacturing apparatus 1006 in accordance with embodiments of the present invention. The additive manufacturing apparatus 1006 is a combination apparatus including a conductive additive manufacturer 1008 for forming three dimensional structures from electrically conductive material, and a non-conductive additive manufacturer 1010 for forming three dimensional structures from non-electrically conductive material. Manufacturers 1008 and 1010 are arranged so as to operate on the same subject article during manufacture such that the article can be subject to either or both the manufacture of conductive content or non-conductive content. It will be appreciated by those skilled in the art that the two manufacturers 1008 and 1010 can be combined or integrated into a single component capable of operating in multiple modes of capable of accommodating both conductive and non-conductive materials. The two manufacturers 1008 and 1010 operate in synchronisation and/or contemporaneously or a mixture of both synchronised and contemporaneous modes. For example, where a conductive additive manufacturing process occurs such that a non-conductive process could occur at the same time, then a contemporaneous mode of operation can be employed (though not necessarily). The operation of the manufacturers 1008 and 1010 is preferably computer controlled. In the embodiment of FIG. 10, a computer system 1012 is communicatively connected to the conductive additive manufacturer 1008 and the non-conductive additive manufacturer 1010 for instructing each of the manufacturers 1008 and 1010 as to additive manufacturing operations that are to be undertaken. The computer system 1012 is responsive to a specification 1004 for an article for manufacture. In one embodiment the specification 1004 is a digital representation of a three dimensional specification of an article for manufacture. For example, for an extrusion-based manufacturing process, the specification can include a definition of the materials for extrusion and the locations, positions, arrangements or configurations of one or more extruding heads, heads for a binder, setter, epoxy or the like and/or a table, workpiece or article holder. The manufacturing process can be defined using vector definitions specifying the discrete or relative movement or relocation etc. Alternatively, in a granular fusing based additive manufacturing approach, a location of fusing, binding, heating or the like can be specified by the specification 1004, such as by way of control instructions for a laser or similar fusion mechanism. In embodiments of the present invention, the specification 1004 is in the form of the Additive Manufacturing File format (AMF) or a Stereolithography file format (STL).

The specification 1004 is provided by a specification definition system 1002 such as a 3D modelling system, a computer aided design (CAD) or computer aided manufacturing (CAM) system as are known in the art. Such systems can be adapted to generate the specification 1004 in an AMF or STL format. Such formats can be adapted to include additional information relating to electronic circuit elements such as active and passive components and electrical connections therebetween.

Figure 11:
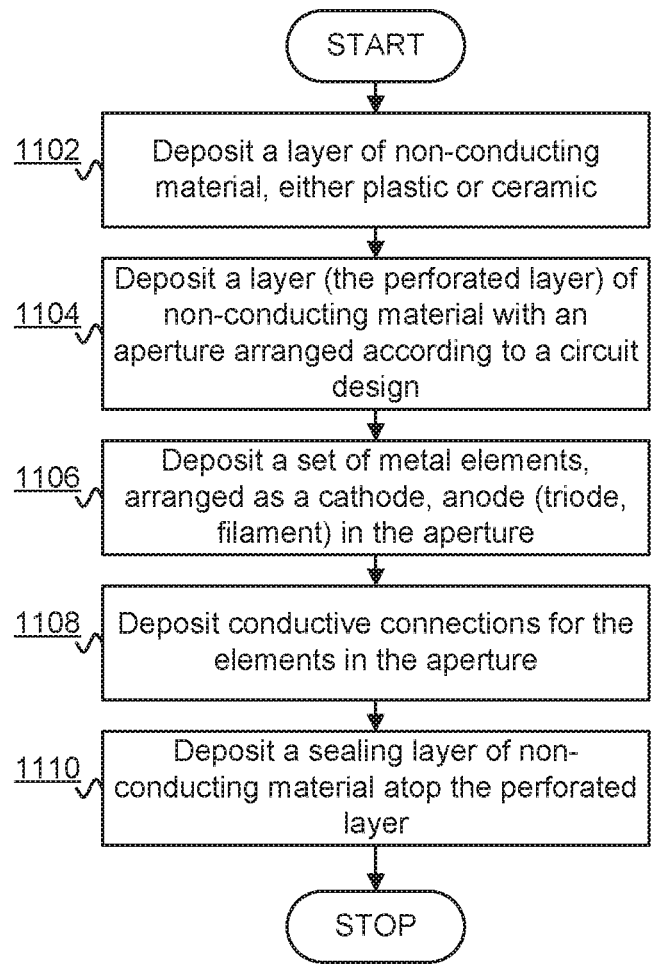
FIG. 11 is a flowchart of a method of manufacturing an article with integral active electronic component in accordance with embodiments of the present invention.

FIG. 11 is a flowchart of a method of manufacturing an article with integral active electronic component in accordance with embodiments of the present invention. Initially, at step 1102, a layer of non-conducting material is deposited by an additive manufacturing process as a substrate 302, such as a plastic or ceramic layer. At step 1104 a layer of non-conducting material with one or more apertures 306 is deposited by an additive manufacturing process as a perforated layer 304. The configuration of the apertures 306 are defined by a circuit design included in a specification 1004 of an article for manufacture. At step 1106 a set of metal elements are deposited in the aperture 306 by an additive manufacturing process arranged as a cathode, anode and, as required, a filament and grid (triode). At step 1108 conductive connections for the elements in the aperture 306 are deposited by an additive manufacturing process. At step 1110 a sealing layer 602 is deposited atop the perforated layer 304.

Figure 12:
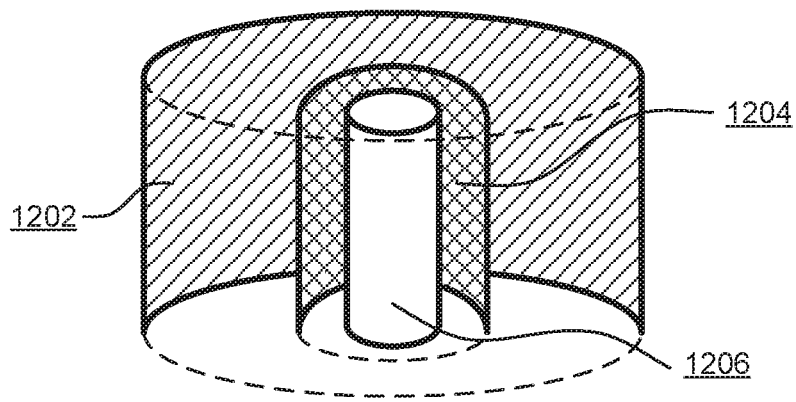
FIG. 12 depicts an arrangement of an active electronic component disposed in an aperture of an article in accordance with embodiments of the present invention.

FIG. 12 depicts an arrangement of an active electronic component disposed in an aperture of an article in accordance with embodiments of the present invention. Previously, the apertures 306 have been illustrated as generally rectangular in shape. FIG. 12 illustrates one alternative configuration of an aperture having a generally circular cross section and being generally cylindrical in shape. In the arrangement of FIG. 12 a cathode 1206 is arranged centrally in the aperture and an anode 1202 is arranged to occupy at least part of, and potentially all of, a wall of the aperture. The cathode 1206 can be further provided with a filament disposed about a central longitudinal axis of the cathode 1206. The arrangement of FIG. 12 is preferable where the non-electrically conductive substrate 302, perforated layer 304 and/or sealing layer 602 are less able to tolerate high temperatures, such as certain plastics and polymers, since a filament can be disposed away from the walls of the aperture and, if configured appropriately and supported such as by electrical connection means, also away from the substrate and sealing layer 602, by being substantially centrally disposed in the centrally positioned cathode 1206. Additionally, in a triode arrangement, a grid 1204 is provided in a concentric arrangement about the cathode 1206 to regulate a flow of electrons arising due to thermionic emission from the hot cathode 1206 to the anode 1202.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of manufacturing an article with integral active electronic component comprising:
   using an additive manufacturing process to:
   a) form a non-electrically conductive substrate;
   b) form a non-electrically conductive perforated layer having an aperture;
   c) form electrically conductive anode and cathode elements spaced in the aperture;
   d) deposit a conductive electrical connection to each of the elements suitable for imparting an electrical potential difference between the elements;
   e) form a non-electrically conductive sealing layer atop the perforated layer so as to retain and seal the aperture in the perforated layer.

2. The method of claim 1 wherein forming one or more of: the substrate; perforated layer; and sealing layer includes forming a channel providing fluid communication between the aperture and an evacuation port of the article, wherein the evacuation port is suitable for evacuating the aperture of gas so as to generate vacuum-like conditions in the aperture.

3. The method of claim 1 wherein the additive manufacturing process takes place within a sealed atmosphere constituted substantially of an inert gas so as to encase the inert gas in the aperture on formation of the sealing layer.

4. The method of claim 1 wherein the anode and cathode are positioned at opposing sides of the aperture.

5. The method of claim 1 wherein the cathode is located centrally in the aperture and the anode occupies at least part of a wall of the aperture.

6. The method of claim 1 wherein the additive manufacturing process includes an extrusion deposition process.

7. The method of claim 1 wherein the additive manufacturing process includes a granular material binding process.

8. The method of claim 1 further comprising: using the additive manufacturing process to form a filament element in thermal proximity with the cathode so as to, in use, induce thermionic emission by the cathode.

9. The method of claim 1 further comprising using the additive manufacturing process to: form a conductive grid element spaced from, and positioned between, the anode and cathode elements; and deposit a conductive electrical connection to the grid for providing an electrical signal to the grid, such that the grid regulates the transmission of electrons from the cathode to the anode.

10. The method of claim 1 wherein at least one of the: non-electrically conductive substrate; perforated layer; and sealing layer are formed in ceramic.

11. The method of claim 1 wherein at least one of the: anode; the grid; and the conductive electrical connections are formed from a gallium alloy.

12. The method of claim 11 wherein the gallium alloy is a binary eutectic alloy of gallium and indium.

13. The method of claim 1 wherein the cathode includes tungsten.

14. An article with integral active electronic component manufactured by the process of claim 1.

15. An additive manufacturing apparatus for manufacturing an article with integral active electronic component, the apparatus comprising:
    a computer system;
    a first additive manufacturing component adapted to form non-electrically conductive three dimensional structures;
    a second additive manufacturing component adapted to form electrically conductive three dimensional structures;

wherein the first and second additive manufacturing components are operable under control of the computer system, the computer system being adapted to control the components to:
    a) form a non-electrically conductive substrate;
    b) form a non-electrically conductive perforated layer having an aperture;
    c) form electrically conductive anode and cathode elements spaced in the aperture;
    d) deposit a conductive electrical connection to each of the elements suitable for imparting an electrical potential difference between the elements;
    e) form a non-electrically conductive sealing layer atop the perforated layer so as to retain and seal the aperture in the perforated layer.

16. A computer system for controlling an additive manufacturing apparatus, the additive manufacturing apparatus being adapted to manufacture three dimensional structures from both non-electrically conductive and electrically conductive materials simultaneously, the computer system being operable to control the additive manufacturing apparatus to perform the method of claim 1.

* * * * *